United States Patent
Rynbrandt

[11] 3,725,423
[45] Apr. 3, 1973

[54] EXO-BICYCLOALKANE CARBOXAMIDES

[75] Inventor: Ronald H. Rynbrandt, Portage, Mich.

[73] Assignee: The Upjohn Company, Kalamazoo, Mich.

[22] Filed: Jan. 14, 1971

[21] Appl. No.: 106,603

[52] U.S. Cl.........260/295 K, 260/557 B, 260/544 L, 424/320, 424/263, 260/598, 260/514 B, 260/468 B, 260/295 AM
[51] Int. Cl........................C07d 31/41, C07c 103/19
[58] Field of Search..............260/295 AM, 295 K, 260/295 D, 557 B

[56] References Cited

UNITED STATES PATENTS

| | | | |
|---|---|---|---|
| 3,008,989 | 11/1961 | Boehme | 260/557 B |
| 3,081,334 | 12/1963 | Kauer | 260/557 B |
| 3,504,030 | 3/1970 | Vogt | 260/557 B |
| 3,546,291 | 8/1970 | Chow | 260/557 B |
| 3,657,273 | 4/1972 | Krimmel | 260/557 B |

OTHER PUBLICATIONS

Kirmse et al. "Chem Ber" Vol. 98, pages 4022–4026 (1965).
Denney et al. "J. Am. Chem. Soc." Vol. 84, pages 3944–3946 (1962).
Mousseron et al. "Comptas Rendus" Vol. 243, pages 1880–1882 (1956).
Chemical Abstracts, Vol 34, Cols. 2822–2823 (1940).
Abstracting J. Ind. Inst Science Vol. 22A pp. 263–274 (1939).

Primary Examiner—Henry R. Jiles
Assistant Examiner—Robert T. Bond
Attorney—Hans L. Berneis and John Kekich

[57] ABSTRACT

Exo-bicycloalkane carboxamides of the formula II:

II 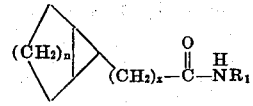

wherein $n$ has the value of 1 to 3, inclusive; wherein $x$ is zero or 1; wherein $R_1$ is hydrogen, alkyl of 1 to 6 carbon atoms, inclusive, 2-pyridyl, phenyl, and substituted phenyl in which the substituents are selected from the group consisting of alkyl of 1 to 3 carbon atoms, inclusive, alkoxy of 1 to 3 carbon atoms, inclusive, halogen, nitro, and trifluoromethyl, are produced by reacting formyl or acetyl exo-bicycloalkane halide of the formula I

I 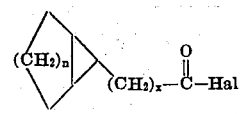

wherein $n$ and $x$ are defined as above, and Hal is chlorine or bromine, with an amine $H_2N-R_1$ in which $R_1$ is defined as above. Compounds 11 have antidiabetic activity and can be used in mammals to treat hyperglycemia.

2 Claims, No Drawings

EXO-BICYCLOALKANE CARBOXAMIDES

BACKGROUND OF THE INVENTION

FIELD OF THE INVENTION

The present invention is concerned with new organic compounds and more particularly with novel exo-bicyclo-alkane carboxamides II and the process of production therefor.

The novel compounds II and the process of production therefor can be illustratively represented as follows:

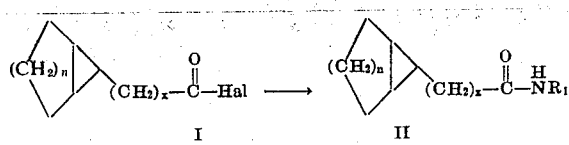

wherein Hal is a halogen selected from the group consisting of chlorine and bromine; wherein n has the value of 1 to 3, inclusive; wherein $x$ is zero or 1; wherein $R_1$ is selected from the group consisting of hydrogen, alkyl of 1 to 6 carbon atoms, inclusive, 2-pyridyl, phenyl and substituted phenyl in which the substitutent is alkyl of 1 to 3 carbon atoms, inclusive, alkoxy of 1 to 3 carbon atoms, inclusive, halogen, nitro and trifluoromethyl.

The process of the present invention comprises: treating a halide of formula I with an amine $H_2NR_1$ in solution to obtain the amide of formula II.

PREFERRED EMBODIMENT OF THE INVENTION

The formulas II herein shown are depicted in the exo configuration, i.e. the chain

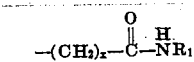

is directed away from the bicycloalkane group. The endo compounds are depicted with the chain

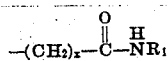

directed toward the bicycloalkane group. As the endo compounds are not orally active antidiabetics, they are not claimed.

The moiety:

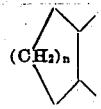

can be cyclopentyl, cyclohexyl, or cycloheptyl, depending on whether n is 1, 2, or 3.

The group $R_1$ refers to: alkyl groups (1-6 carbon atoms, inclusive) e.g. propyl, isopropyl, butyl, isobutyl, t-butyl, pentyl, isopentyl, t-pentyl, and hexyl, and the like.

The substituted phenyl groups also include o-, m-, p-tolyl; o-, m-, p-ethylphenyl, and propyl and isopropyl substituted phenyls, with the alkyls in o-, m-, and p-positions. Included also are phenyls substituted with fluorine, chlorine, bromine, iodine, $-NO_2$, and $-CF_3$, methoxy, ethoxy, propoxy, and isopropoxy in positions ortho, meta, or para, with respect to the attachment of the phenyl group to the N-atom in Compound II.

The compounds of the present invention are useful oral antidiabetic agents. In the past diabetes has been alleviated primarily by the use of insulin. Unfortunately, however, insulin cannot be given orally. Thus, the diabetics before the advent of sulfonylurea therapy for the treatment of diabetes were faced with a lifetime of insulin injections necessary for the maintenance of bodily health. The compounds of the present invention thus provide a means for the relief of diabetes without the necessity of injections. The novel compounds II are not only capable of reducing blood sugar to a safe level for a considerable period of time but, in addition, also bring about satisfactory blood-sugar reduction at low dosage levels.

For example, for tolbutamide the lowest doses with consistent hypoglycemic activity in the glucose-primed, fasted, intact rat is about 25 mg./kg., whereas N-(2-pyridyl)exo-bicyclo[3.1.0.]hexane-6-carboxamide exhibits the same activity at 6.25 mg./kg.

All blood sugar determinations were made according to the following procedure:

Glucose-primed, fasted (18–24 hrs.), intact male rats are the test animal. The test compound is administered orally at a dosage of 100 mg./kg. or less in 0.5 cc. sterile vehicle (6 rats/group). Immediately following administration of the test material, the animals are injected subcutaneously with 125 mg. of glucose in 1 ml. 0.9 percent saline. Two hours later the rats are bled, via the vena cava, while under Cyclopal anesthesia, and blood sugars were determined. A significant depression of blood sugar from that of controls indicates activity.

For such oral administration the active compounds can be administered in liquid or solid dosage forms. Solid forms include capsules, tablets, powders, pills, and the like, and liquid forms include suitably flavored aqueous suspensions and solutions (depending on concentration desired), and flavored oil suspensions and solutions where-in edible oils, e.g., corn oil, cottonseed oil, coconut oil, peanut oil, sesame oil, or mixtures of these and the like can be employed.

For preparing compositions such as tablets and other compressed formulations, the composition can include any compatible and edible tableting material used in pharmaceutical practice, e.g., corn starch, lactose, stearic acid, magnesium stearate, talc, methyl cellulose, and the like.

Similarly, the compounds of the present invention can be mixed with suitable adjuvants for the preparation of resorbable hard gelatin or soft gelatin capsules utilizing conventional pharmaceutical practices.

The following illustrative compositions are within the scope of the present invention:

1. Hard gelatin capsules. — 10,000 two-piece hard gelatin capsules for oral use, each containing 200 milligrams of N-(2-pyridyl)-exo-bicyclo[3.1.0]hexane-6-carboxamide are prepared from the following amounts and types of materials:

| | |
|---|---|
| N-(2-pyridyl)-exo-bicyclo[3.1.0.] hexane-6-carboxamide | 2000 gm. |
| Corn starch | 1616 gm. |
| Mineral oil, U. S. P. | 129.6 gm. |
| Magnesium stearate, powder | 162 gm. |
| Talc, u. s. p. | 162 gm. |

The finely powdered N-(2-pyridyl)-exo-bicyclo[3.1.0.]-hexane-6-carboxamide is mixed thoroughly with the rest of the ingredients and then capsulated.

2. Soft elastic capsules-One piece soft elastic capsules for oral use, each containing 100 milligrams of N-(2-pyridyl)exo-bicyclo[3.1.0.]hexane-6-carboxylate are prepared in the usual manner by first dispersing the active ingredient in sufficient corn oil to render the material capsulatable.)

3. Oil suspension-An oil suspension for oral use containing in each 5 milliliters 200 milligrams of N-(2-pyridyl)-exo-bicyclo[3.1.0.]hexane-6-carboxylamide is prepared from the following types and amounts of materials:

| | |
|---|---|
| Sweetening agent | 3.5 gm. |
| N-(2-pyridyl)-exo-bicyclo[3.1.0.]-hexane-6-carboxamide | 400 gm. |
| Preservative | 20 gm. |
| Antioxidant | 1 gm. |
| Flavoring | 25 ml. |

Aluminum monostearate-corn oil gel q. s. 10,000 ml.

4. Tablet-10,000 oral tablets each containing 250 milligrams of N-(2-pyridyl)-exo-bicyclo[3.1.0.]hexane-6-carboxamide are prepared from the following types and amounts of materials:

| | |
|---|---|
| N-(2-pyridyl)-exo-bicyclo[3.1.0.]-hexane 6-carboxamide | 2500 gm. |
| Dicalcium phosphate | 3050 gm. |
| Methylcellulose, U. S. P. (15 cps.) | 65 gm. |
| Talc, bolted | 450 gm. |
| Calcium stearate, fine powder | 35 gm. |

The ingredients are mixed in a conventional manner and compressed into tablets, each containg 250 mg. of active ingredient 5. Syrup-A sugar-free syrup for oral use containing in each 5 milliliters 250 milligrams N-(2-pyridyl)exo-bicyclo[3.1.0.]hexane-6-carboxamide is prepared from the following types and amounts of materials:

| | |
|---|---|
| N-(2-pyridyl)-exo-bicyclo[3.1.0.]-hexane-6-carboxamide | 500 gm. |
| Methylparaben, U. S. P. | 3 gm. |
| Sorbic acid | 3 gm. |
| Sweetening agent | 18 gm. |
| Flavoring | 3 ml. |
| Glycerin | 1500 ml. |
| Deionized water q.s. | 10,000 ml. |

A dose of 1 teaspoonful (5 ml.) to 1 tablespoonful (15 ml.) will give the patient 250 to 750 mg. of N-(2-pyridyl)-exo-bicyclo[3.1.0.]hexane-6-carboxamide.

The dosage of the novel compounds II of the present invention for the treatment of diabetes depends on the age, weight, and condition of the patient being treated. Generally speaking for adult oral administration the preferred unit dosage is 50 to 1000 mg. of active compounds with a suitable pharmaceutical diluent and/or lubricant. One or two unit dosages are given one to four times a day. A total daily dose of from 50 to 4000 mg. given singly, or preferably in divided doses, embraces the effective range for the treatment of diabetes.

In addition to the foregoing principal active ingredients, the present compositions can also include, as supplementary active ingredients, other blood sugar lowering compounds, such as tolbutamide, chlorpropamide, and phenformin. Such supplementary active ingredients can be included in these compositions in amounts approximately equal to or less than the concentrations employed where each material are the sole active ingredients.

Starting compounds of structural formula I of this invention are prepared e.g. with thionyl chloride from bicycloalkane carboxylic acid which are either disclosed in the art or can be prepared as shown in the art [e.g. J. Meinwald et al., J. Am. Chem. Soc. 85, 582-585 (1963)]and in the Preparations 1–6.

In carrying out the process of this invention, the selected exo-bicycloalkane carboxylic acid chloride or possible as bromide is reacted in solution with an amine $H_2N-R_1$, wherein $R_1$ has the value given before. The solvents used in this reaction are organic solvents, inert toward the reactants of this invention and liquid at the temperatures herein used i.e. at room temperatures (20°–30° C.). The reaction is carried out between about 10° to 50° C.

Carbontetrachloride, chloroform, methylene chloride, benzene, toluene, ether, tetrahydrofuran and the like can be used as solvents If the amine above is ammonia, a partially aqueous solvent can be used.

The reaction time which varies with the reaction temperature, reagents, solvents, and the like, can be between one-half hour and 48 hours or more. At the termination of the reaction, the desired product is separated by conventional procedures, for example by extraction, chromatography, crystallization, distillation and the like.

The following Preparations and Examples are illustrative of the products of the present invention, but are not to be construed as limiting.

Preparation 1 Bicyclo[3.1.0.]hex-2-ene-6-endo-carbonaldehyde

To a rapidly stirred suspension of 392.0 g. (3.7 moles) of anhydrous sodium carbonate in a solution of 276.4 g. (3.0 moles) of bicyclo[2.2.1.]heptadiene in 1.7 l. methylene chloride was added 285 g. of 40 percent peracetic acid, which had been previously treated with 7.5 g. sodium acetate. The temperature was maintained at about 20° C. during the addition which required about 2 hours. The reaction mixture was stirred for an additional 2 ½ hours and allowed to stand overnight. The inorganic solids were filtered off and washed with methylene chloride. The methylene chloride (filtrate and wash) was distilled from the filtrate through a Vigreux column and the residual yellow oil (about 400 ml.) was used directly in the next step.

Preparation 2 Bicyclo[3.1.0.]hex-2-ene-6-endo-carboxylic acid

The crude bicyclo[3.1.0.]hex-2-ene-6-endo-carboxaldehyde from the previous step was mixed with 850 g. (5.0 moles) silver nitrate, 2 l. of water and 1 l. of 95 percent ethanol and stirred vigorously. A solution of 300 g. (7.5 moles) of sodium hydroxide in 4 l. of water was added over a period of 3 hours. The reaction is slightly exothermic. The mixture was allowed to stand overnight and the solids were filtered through Celite and washed with water. The filtrate was extracted with 3 × 1 l. of methylene chloride and the extracts were discarded. The aqueous phase was acidified with 280 ml. of concentrated hydrochloric acid and extracted with 6 × 1 l. methylene chloride. The extract was dried over anhydrous sodium sulfate and the solvent was removed under vacuum to give 148 g. of yellow crystals. Crystallization from about 800 ml. Skellysolve B hexanes and through (Darco) activated charcoal gave 131.7 g. of off white crystals of bicyclo [3.1.0.]-hex-2-ene-6-endo-carboxylic acid of melting point 88°–91 C. Overall yield (from bicyclo[2.2.1.]heptadiene) was 71 percent.

Preparation 3 Bicyclo[3.1.0.]hexane-6-endo-carboxylic acid

Bicyclo[3.1.0.]-hex-2-ene-6-endo-carboxylic acid (131 g., 1.05 moles) was divided into 5 equal portions. Each was dissolved in 200 ml. absolute ether, 0.5 g. platinum oxide was added and the solutions were hydrogenated in a Parr Hydrogenator at an initial pressure of 50 lbs. until the hydrogen uptake ceased (6–8 minutes). The bottles were allowed to cool, the catalyst was filtered off and the combined filtrates were evaporated. The residue was crystallized from 350 ml. of Skellysolve B hexanes to yield 118 g. (89 percent) of white needles of bicyclo-[3.1.0.]hexane-6-endo-carobxylic acid in two crops of melting point 82°–85° C.

Preparation 4 Methyl Bicyclo[3.1.0.]hexane-6-endo-carboxylate

Bicyclo[3.1.0.]hexane-6-carboxylic acid (18.9 g., 0.15 mole) was added in small portion to an etheral solution of diazomethane. The reaction mixture was allowed to stand overnight and the excess diazomethane was destroyed by the addition of acetic acid Half the ether was distilled and the concentrated solution was extracted twice with aqueous sodium bicarbonate followed by saturated salt solution. After drying the ether layer over magnesium sulfate, the solvent was distilled on the steam bath. Distillation of the residue under reduced pressure gave 19.8 g. (94 percent) of methyl bicyclo[3.1.0.]hexane-6-endo-carobxylate as a colorless oil, of boiling point 71°–73°C.

Anal. calcd. for $C_8H_{12}O_2$: C, 68.54; H, 8.63.

Found: C, 68.36; H, 8.47.

Preparation 5 Exo-Bicyclo[3.1.0.]hexane-6-carboxylic acid

Methyl bicyclo[3.1.0.]hexane-6-endo-carboxylate (18.3 g.; 0.13 mole) was added to a solution of 9.0 g (0.39 mole) of sodium in 250 ml. absolute ethanol and refluxed for 24 hours. The ethanol was distilled and the residue was washed twice with ether. The aqueous phase was acidified with concentrated hydrochloric acid and refrigerated. Yellow crystals separated and were filtered and washed with water. The crude product was dissolved in Skelly-solve B hexanes. The organic layer was separated from a small water layer and then treated with Darco activated charcoal. The resulting colorless solution was concentrated to circa 40 ml. and refrigerated to yield 12.4 g. (76 percent) of exo-bicyclo[3.1.0.]hexane-6-carboxylic acid in large colorless plates of melting point 59.5°–61.5°C.

Preparation 6 Exo-bicyclo[3.1.0.]hexane-6-acetic acid

Exo-bicyclo[3.1.0.]hexane-6-formyl chloride (5.8 g; 0.040 moles) was added in small portions over a period of 10 minutes to the well stirred diazomethane solution maintained at 3° to 5° by means of an ice bath. After 30 minutes, stirring was discontinued and the reaction vessel was removed from the ice bath and allowed to warm to room temperature. An inverted recyrstallizing dish was placed over the neck of the flask in order to minimize the loss of diazomethane through evaporation.

The reaction flask was allowed to stand undisturbed for three days in a well ventilated hood. It was then transferred to a beaker and the solution allowed to evaporate. The crude residue thus obtained was shown to contain the desired diazoketone by its infrared and mnr spectra. It was subjected to a Wolff rearrangement without purification.

The well stirred solution of the crude diazoketone in absolute methanol (300 ml.) at room temperature was treated with a freshly prepared solution of silver benzoate (3.0 g.) in triethylamine (30 ml.). Bubbles of gas were almost immediately emitted. When the bubbling subsided additional silver benzoate solution (1 g. of silver benzoate in 10 ml. of the triethylamine) was added. Stirring was continued for one hour and then the reaction mixture was allowed to stand for several days. It was then filtered through a pad of diatomaceous earth (Celite) and concentrated in vacuo to a viscous brown oil. This was dissolved in ether (400 ml.) and washed successively with water (2 × 250 ml.), 1 N hydrochloric acid (2 × 250 ml.) and finally with aqueous saturated sodium bicarbonate (2 × 400 ml.). The ether solution was dried over anhydrous magnesium sulfate. This was concentrated in vacuo to a red oil which, when subjected to vacuum distillation, gave 1.96 g. (32 percent overall yield) of methyl exo-bicyclo[ 3.1.0.]hexane-6-acetate as pale green oil of boiling point 70°C. at 3.0 mm. Hg.

The above ester(1.96 g; 0.013 moles) dissolved in ethanol (10 ml.) was combined with a 20 percent (w/v) potassium carbonate solution (40 ml.) and heated under gentle reflux with rapid stirring for two hours. After cooling to room temperature, the reaction mixture was diluted with water (200 ml.) and washed with ether (2 × 200 ml.). The aqueous layer was then acidified with 2.5 N sulfuric acid and the resultant suspended oil extracted with ether (2 × 15. ml.). The combined ether extracts were dried overnight over anhydrous magnesium sulfate. Concentration in vacuo gave a nearly colorless, clear oil (1.4 g.). Vacuum distillation of this oil gave 1.05 g. (58 percent yield) of exo-bicyclo[3.1.0.]-hexane-6-acetic acid as clear, colorless, noncrystallizable liquid, of boiling point 82° C. at 0.1 mm. Hg.

Anal. calcd. for $C_8H_{12}O_2$: C, 68.54; H, 8.63.

Found: C, 68.25; H, 8.53.

These acids from the Preparations together with thionyl chloride and thionyl bromide are used to make, in conventional manner, the acid chlorides and acid bromides of formula I, used as starting materials.

Example 1 Exo-bicyclo[3.1.0.]hexane-6-carboxamide

Exo-bicyclo[3.1.0.]hexane-6-formyl chloride (11.4 g.; 0.079 moles) dissolved in chloroform (50 ml.) was added dropwise to a vigorously stirred mixture of chloroform (50 ml.) and 30 percent aqueous ammonia (55 ml.) and 50 ml. of chloroform maintained at 20°–25 C. by means of a water bath. After being stirred vigorously for one additional hour, a nearly colorless crystalline solid was deposited which was removed by vacuum filtration, washed with water (100 ml.) and air-dried. Recrystallization from chloroform gave 5.7 g. (58 percent) of exo-bicyclo[3.1.0.]hexane-6-carboxamide as colorless needles of melting point 198°–199°C.

Anal. calcd. for $C_7H_{11}NO$: C, 67.17; H, 8.86; N, 11.19.
Found: C, 67.24; H, 8.74; N, 11.13.

Example 2 Exo-bicyclo[4.1.0.]heptane-7-carboxamide

In the manner given in Example 1, exo-bicyclo[4.1.0.]heptane-7-acetyl chloride in chloroform was added to aqueous ammonia at room temperature to give exo-bicyclo[4.1.0.]-heptane-7-carboxamide.

Example 3 Exo-bicyclo[5.1.0.]octane-8-carboxamide

In the manner given in Example 1, exo-bicyclo[5.1.0.]-octane-8-formyl bromide in chloroform was added to aqueous ammonia at room temperature to give exo-bicyclo[5.1.0.]-octane-8-carboxamide.

Example 4 Exo-bicyclo[3.1.0.]hexane-6-acetamide

In the manner given in Example 1, exo-bicyclo[3.1.0.]-hexane-6-acetyl chloride in chloroform was added to aqueous ammonia at room temperature to give exo-bicyclo[3.1.0.]-hexane-6-acetamide.

Example 5 Exo-bicyclo[4.1.0.]-heptane-7-acetamide

In the manner given in Example 1, exo-bicyclo[4.1.0.]-heptane-7-acetyl chloride in chloroform was added to aqueous ammonia at room temperature to give exo-bicyclo[4.1.0.]-heptane-7-acetamide.

Example 6 Exo-bicylo[5.1.0.]octane-8-acetamide

In the manner given in Example 1, exo-bicyclo[5.1.0.]-octane-8-formyl bromide in chloroform was added to aqueous ammonia at room temperature to give exo-bicyclo[5.1.0.]-octane-8-acetamide.

Example 7 Exo-bicyclo[3.1.0.]hexane-6-carbox-p-aniside

Exo-bicyclo[3.1.0.]hexane-6-formyl chloride (11.4 g., 0.079 moles) in 50 ml. of chloroform was added dropwise to a solution of p-anisidine (10.7 g., 0.087 moles) and 8.8 g. (0.087 moles) of triethylamine in 100 ml. of chloroform were maintained at 20–25° C. in a water-bath. The amide partially precipitated as an off-white crystalline solid during the addition of the acid chloride. The reaction mixture was evaporated to dryness and the pasty solid was agitated vigorously with 3N hydrochloric acid (150 ml.) for 15 min. It was then washed thoroughly with water, followed by 10 percent sodium bicarbonate. After a final washing with water the solid was partially dried in air and then dried overnight under vacuum at 35° in a slow stream of nitrogen. One recyrstallization from chloroform containing a small amount of n-hexane gave 11.7 g. (64 percent yield) of melting point 180.5°–181° C.

Anal. Calcd. for $C_{x4}H_{17}NO_2$: C, 72.70; H, 7.41; N, 6.06.
Found: C, 72.71; H, 7.58; N, 6.11.

Example 8 Exo-bicyclo[3.1.0.]hexane-6-carboxanilide

In the manner given in Example 7, exo-bicyclo[3.1.0.]-hexane-6-formyl chloride in chloroform was added to aniline and triethylamine in chloroform at room temperature to give exo-bicyclo[3.1.0.]hexane-6-carboxanilide.

Example 9 Exo-bicyclo[4.1.0.]heptane-7-carbox-m-nitroanilide

In the manner given in Example 1, exo-bicyclo[4.1.0.]-heptane-7-formyl bromide in chloroform was added to m-nitroaniline at room temperature to give exo-bicyclo[4.1.0.]-heptane-7-carbox-m-nitroanilide.

Example 10 Exo-bicyclo[5.1.0.]octane-8-carbox-m-toluidide.

In the manner given in Example 1, exo-bicyclo[5.1.0.]-octane-8-acetyl chloride in chloroform was added to m-toluidine at room temperature to give exo-bicyclo[5.1.0.]octane 8-carbox-m-toluidide.

Example 11 Exo-bicyclo[3 1.0.]hexane-6-carbox-(o-chloroanilide)

In the manner given in Example 1, exo-bicyclo[3.1.0.]-hexane-6-formyl bromide in chloroform was added to o-chloroaniline at room temperature to give exo-bicyclo[3.1.0.]-hexane-6-carox-(o-chloroanilide).

Example 12 Exo-bicyclo[4.1.0.]heptane-7-carbox-(m-trifluoromethylanilide)

In the manner given in Example 1, exo-bicyclo-[4.1.0.]heptane-7-formyl bromide in chloroform was added to m-trifluoromethylaniline at room temperature to give exo-bicyclo-[4.1.0.]heptane-7-carbox-(m-trifluoromethyl)anilide.

Example 13 Exo-bicyclo[5.1.0.]octane-8-acet(m-isopropoxyanilide)

In the manner given in Example 1, exo-bicyclo-[5.1.0.]octane-8-acetyl chloride in chloroform was added to m-isopropoxyaniline at room temperature to give exo-bicyclo [5.1.0.]octane-8-acet-(m-isopropoxyanilide).

Example 14 Exo-bicyclo[5.1.0.]octane-8-acet-(p-bromoanilide)

In the manner given in Example 1, exo-bicyclo-[5.1.0.]octane-8-acetyl chloride in chloroform was added to p-bromoaniline at room temperature to give exo-bicyclo[5.1.0.]-octane-8-acet-(p-bromoanilide).

Example 15 Exo-bicyclo[3.1.0.]hexane-6-N-methylcarboxamide

In the manner given in Example 1, exo-bicyclo-[3.1.0.]-hexane-6-formyl chloride in chloroform was added to aqueous methyl amine at room temperature to give exo-bicyclo[3.1.0.]hexane-6-N-methylcarboxamide.

Example 16 Exo-bicyclo[4.1.0.]heptane-7-N-hexylacetamide

In the manner given in Example 1, exo-bicyclo-[4.1.0.]heptane-7-acetyl chloride in chloroform was added to monohexylamine at room temperature to give exo-bicyclo[4.1.0.]-heptane-7-N-hexylacetamide.

Example 17 Exo-bicyclo[5.1.0.]octane-8-(N-butylcarboxamide)

In the manner given in Example 1, exo-bicyclo-[5.1.0.]octane-8-formyl bromide in chloroform was added to aqueous butyl amine at room temperature to give exo-bicyclo[5.1.0.]-octane-8-N-butylcarboxamide.

Example 18 N-(2-pyridyl)-exo-bicyclo[3.1.0.]hexane-6-carboxamide.

Exo-bicyclo[3.1.0.]hexane-6-formyl chloride(11.4 g.; 0.079 mole) in 50 ml. of chloroform was added dropwise to a well-stirred solution of 82 g. (0.087 moles) of 2-aminopyridine and 8.8 g. (0.087 moles) of triethylamine in 100 ml. of chloroform.

There was obtained a yellow oil which crystallized on standing overnight at −15°. Recyrstallization from n-hexane gave 3.1 g. (19.4% yield) of N-(2-pyridyl)-exo-bicyclo-[3.1.0.]hexane-6-carboxamide as light tan needles of melting point 122°–123.5° C. The filtrate was concentrated by one-half and chilled at −15° overnight to afford a second crop of crystals (1.0 g.). This was subjected to absorption chromatography on 150 g. of silica gel. The column was eluted with 300 ml. of 1:1 toluene-acetic acid. Fifteen fractions were collected. From fractions 1 to 3 there was obtained, after one recrystallization from n-hexane, 0.3 g. of N-(2-pyridyl)-exo-bicyclo[3.1.0.]hexane-6-carboxamide of melting point 123°–124° C.

Anal. calcd. for $C_{12}H_{14}N_2O$: C, 71.26; H, 6.98; N, 13.85.

Found: C, 71.36; H, 7.25; N, 14.12.

Example 19 N-(2-pyridyl)-exo-bicyclo[4.1.0.]heptane-7-carboxamide

In the manner given in Example 18, exo-bicyclo[4.1.0.]-heptane-7-formyl chloride was added to 2-aminopyridine and triethylamine to give N-(2-pyridyl)-exo-bicyclo[4.1.0.]-heptane-7-carboxamide which was recovered by chromatography as in Example 18.

Example 20 N-(2-pyridyl)-exo-bicyclo[5.1.0.]octane-8-carboxamide.

In the manner given in Example 18, exo-bicyclo[5.1.0.]-octane-8-formyl chloride was added to 2-aminopyridine and triethylamine to give N-(2-pyridyl)-exo-bicyclo[5.1.0.]-octane-8-carboxamide which was recovered by chromatography as in Example 18.

Example 21 N-(2-pyridyl)-exo-bicyclo[4.1.0.]heptane-7-acetamide.

In the manner given in Example 18, exo-bicyclo[4.1.0.]-heptane-7-acetyl chloride was added to 2-aminopyridine and triethylamine to give N-(2-pyridyl)-exo-bicyclo[4.1.0.]-heptane-7-acetamide which was recovered by chromatography as in Example 18.

Example 22 N-(2-pyridyl)-exo-bicyclo[5.1.0.]octane-8-acetamide

In the manner given in Example 18, exo-bicyclo[5.1.0.]-octane-8-acetyl chloride was added to 2-aminopyridine and triethylamine to give N-(2-pyridyl)-exo-bicyclo[5.1.0.]-octane-8-acetyl chloride was added to 2-aminopyridine and triethylamine to give N-(2-pyridyl)-exo-bicyclo[5.1.0.]-octane-8-acetamide which was recovered by chromatography as in Example 18.

In the manner given in the preceding Examples reacting a formyl or acetyl exo-bicycloalkane of formula I with an amino compound $H_2NR_1$ defined above, other exobicycloalkane acid amide of formula II are obtained. Representative compounds thus obtained, include:

Exo-bicyclo[3.1.0.]hexane-6-(N-ethylcarboxamide);
Exo-bicyclo[3.1.0.]hexane-6-(N-propylcarboxamide);
Exo-bicyclo[3.1.0.]hexane-6-(N-isopropylcarboxamide);
Exo-bicyclo[3.1.0.]-hexane-6-(N-isobutylacetamide);
Exo-bicyclo[3.1.0.]hexane-6-(N-pentylacetamide);
Exo-bicyclo[3.1.0.]hexane-6-(N-isohexylacetamide);
Exo-bicyclo[4.1.0.]heptane-7-(N-methylcarboxamide);
Exo-bicyclo[4.1.0.]heptane-7-(N-methylacetamide);
Exo-bicyclo[4.1.0.]heptane-7-(N-isobutylcarboxamide);
Exo-bicyclo[4.1.0.]heptane-7-(N-isopentylacetamide);
Exo-bicyclo[4.1.0.]heptane-7-(N-hexylcarboxamide);
Exo-bicyclo[5.1.0.]octane-8-(N-methylacetamide);
Exo-bicyclo[5.1.0.]octane-8-(N-ethylcarboxamide);
Exo-bicyclo[5.1.0.]octane-8-(N-hexylacetamide);
Exo-bicyclo[5.1.0.]octane-8-(N-pentylcarboxamide);
Exo-bicyclo[3.1.0.]hexane-6-(carbox-o-iodoanilide);
Exo-bicyclo[3.1.0.]hexane-6-carbox-(p-trifluoromethylanilide);
Exo-bicyclo[3.1.0.]hexane-6-carbox-(o-nitroanilide);
Exo-bicyclo[4.1.0.]heptane-7-carboxanilide;
Exo-bicyclo[4.1.0.]heptane-7-carbox-(m-propylanilide);
Exo-bicyclo[5.1.0.]octane-8-carboxanilide.
Exo-bicyclo[5.1.0.]octane-8-carbox(m-trifluoromethylanilide);
Exo-bicyclo[5.1.0.]octane-8-carbox(o-fluoroanilide);
Exo-bicyclo[5.1.0.]octane-8-carbox(o-bromoanilide);
Exo-bicyclo[5.1.0.]octane-8-carbox-(o-iodoanilide);
Exo-bicyclo[3.1.0.]hexane-6-acet(o-iodoanilide);
Exo-bicyclo[3.1.0.]hexane-6-acet(p-trifluoromethylanilide);
Exo-bicyclo[3.1.0.]hexane-6-acet-(o-nitroanilide);
Exo-bicyclo[4.1.0.]heptane-7-acetanilide;
Exo-bicyclo[4.1.0.]heptane-7-acet-(m-propylanilide);
Exo-bicyclo[5.1.0.]octane-8-acetanilide;
Exo-bicyclo[5.1.0.]octane-8-acet(m-trifluoromethylanilide);
Exo-bicyclo[5.1.0.]octane-8-acet(o-fluoroanilide);
Exo-bicyclo[5.1.0.]octane-8-acet(o-bromoanilide);
Exo-bicyclo[5.1.0.]octane-8-acet(o-iodoanilide);
N-(2-pyridyl)-exo-bicyclo[3.1.0.]hexane-6-acetamide; and the like.

I claim:

1. Exo-bicyclo[3.1.0]hexane-6-carbox-p-aniside.

2. N-(2-pyridyl)-exo-bicyclo[3.1.0.]hexane-6-carboxamide.

* * * * *